US012780046B2

(12) United States Patent
Shibata et al.

(10) Patent No.: US 12,780,046 B2
(45) Date of Patent: Nov. 3, 2026

(54) SEATING POSITION DETERMINATION APPARATUS, SYSTEM, METHOD, AND COMPUTER-READABLE MEDIUM

(71) Applicant: NEC Corporation, Tokyo (JP)

(72) Inventors: Koyo Shibata, Tokyo (JP); Kazuki Inagaki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 222 days.

(21) Appl. No.: 18/711,653

(22) PCT Filed: Nov. 26, 2021

(86) PCT No.: PCT/JP2021/043434
§ 371 (c)(1),
(2) Date: May 20, 2024

(87) PCT Pub. No.: WO2023/095297
PCT Pub. Date: Jun. 1, 2023

(65) Prior Publication Data

US 2025/0010764 A1 Jan. 9, 2025

(51) Int. Cl.
*B60N 2/00* (2006.01)
*G06T 7/73* (2017.01)
(Continued)

(52) U.S. Cl.
CPC .............. *B60N 2/0022* (2023.08); *G06T 7/73* (2017.01); *G06V 20/593* (2022.01);
(Continued)

(58) Field of Classification Search
CPC ...... B60N 2/0022; G06T 7/73; G06V 40/168; G06V 40/172; G06V 40/161; G06V 20/593
(Continued)

(56) References Cited

U.S. PATENT DOCUMENTS 11,498,500 B1 * 11/2022 Pertsel ................ G06V 40/103
2014/0055342 A1 * 2/2014 Kamimura ........... G06V 40/193 345/156
(Continued)

FOREIGN PATENT DOCUMENTS

JP 2010-013054 A 1/2010
JP 2012-001125 A 1/2012
(Continued)

OTHER PUBLICATIONS

International Search Report for PCT Application No. PCT/JP2021/043434, mailed on Feb. 15, 2022.

*Primary Examiner* — William D Titcomb
(74) *Attorney, Agent, or Firm* — Sughrue Mion, PLLC

(57) ABSTRACT

A camera is installed in a vehicle in which a plurality of seat rows are arranged, and captures an image of an inside of the vehicle. A face detection unit detects a face region of a passenger from the image captured by the camera. A seating row specification unit specifies a seat row in which the passenger with the face region being detected is seated. A seating position specification unit specifies a seat position of the passenger in the vehicle, based on a range of a seat position in the image and the seat row being specified, the range of the seat position being prepared for each seat row.

16 Claims, 9 Drawing Sheets

(51) Int. Cl.
*G06V 20/59* (2022.01)
*G06V 40/16* (2022.01)

(52) U.S. Cl.
CPC .......... *G06V 40/161* (2022.01); *G06V 40/168* (2022.01); *G06V 40/172* (2022.01); *G06T 2207/30201* (2013.01); *G06T 2210/00* (2013.01)

(58) Field of Classification Search
USPC .......................................................... 382/103
See application file for complete search history.

(56) References Cited

U.S. PATENT DOCUMENTS

| | | | | |
|---|---|---|---|---|
| 2015/0009010 | A1* | 1/2015 | Biemer | G06F 21/32 340/5.83 |
| 2017/0124987 | A1* | 5/2017 | Kim | B60K 35/10 |
| 2021/0001796 | A1* | 1/2021 | Kudo | A61B 5/18 |
| 2022/0245966 | A1* | 8/2022 | Wu | G06V 40/164 |

FOREIGN PATENT DOCUMENTS

| | | | |
|---|---|---|---|
| JP | 2018-027731 | A | 2/2018 |
| WO | 2019/180876 | A1 | 9/2019 |

* cited by examiner

SEATING POSITION DETERMINATION APPARATUS, SYSTEM, METHOD, AND COMPUTER-READABLE MEDIUM

This application is a National Stage Entry of PCT/JP2021/043434 filed on Nov. 26, 2021, the contents of all of which are incorporated herein by reference, in their entirety.

TECHNICAL FIELD

The present disclosure relates to a seating position determination apparatus, a system, a method, and a computer-readable medium.

BACKGROUND ART

As a related art, Patent Literature 1 discloses an airbag apparatus and a deployment control method thereof. In Patent Literature 1, a camera captures an image of a passenger seated in a seat in which an airbag is installed. A passenger recognition unit subjects the image captured by the camera to image processing, and acquires a position of the passenger present in the image. A distance recognition unit acquires a distance from a reference position to the passenger. A position detection unit detects an actual position of the passenger seated in the seat, based on a position of the passenger in the image and a distance from the reference position to the passenger, which is acquired by the distance recognition unit. A deployment control unit determines whether a head of the passenger is positioned within an airbag operation range. When the head of the passenger is positioned within the airbag operation range, the deployment control unit deploys the airbag.

CITATION LIST

Patent Literature

Patent Literature 1: Japanese Unexamined Patent Application Publication No. 2012-001125

SUMMARY OF INVENTION

Technical Problem

In Patent Literature 1, the position detection unit detects an actual position of the passenger seated in the seat. However, in Patent Literature 1, the position of the head of the passenger is detected for comparison with the airbag operation range, and which seat the passenger is seated in is not specified.

In view of the above-mentioned circumstances, an object of the present disclosure is to provide a seating position determination apparatus, a system, a method, and a computer-readable medium that are able to specify which seat a passenger is seated in.

Solution to Problem

In order to achieve the above-mentioned object, in a first aspect, the present disclosure provides a seating position determination apparatus. The seating position determination apparatus includes a face detection means for detecting a face region of a passenger from an image captured by a camera installed inside a vehicle in which a plurality of seat rows are arranged, a seating row specification means for specifying a seat row in which the passenger with the face region being detected is seated, and a seating position specification means for specifying a seat position of the passenger in the vehicle, based on a range of a seat position in the image and the seat row being specified, the range of the seat position being prepared for each seat row.

In a second aspect, the present disclosure provides a seating position determination system. The seating position determination system includes a camera being installed in a vehicle in which a plurality of seat rows are arranged and being configured to capture an image of an inside of the vehicle, and a seat position determination apparatus configured to acquire an image captured by the camera and specifying a seat position of a passenger in the vehicle by using the acquired image. The seat position determination apparatus includes a face detection means for detecting a face region of the passenger from the image, a seating row specification means for specifying a seat row in which the passenger with the face region being detected is seated, and a seating position specification means for specifying a seat position of the passenger in the vehicle, based on a range of a seat position in the image and the seat row being specified, the range of the seat position being prepared for each seat row.

In a third aspect, the present disclosure provides a seating position determination method. The seating position determination method includes detecting a face region of a passenger from an image captured by a camera installed inside a vehicle in which a plurality of seat rows are arranged, specifying a seat row in which the passenger with the face region being detected is seated, and specifying a seat position of the passenger in the vehicle, based on a range of a seat position in the image and the seat row being specified, the range of the seat position being prepared for each seat row.

In a fourth aspect, the present disclosure provides a computer-readable medium. The computer-readable medium is configured to store a program for causing a processor to execute processing of detecting a face region of a passenger from an image captured by a camera installed inside a vehicle in which a plurality of seat rows are arranged, specifying a seat row in which the passenger with the face region being detected is seated, and specifying a seat position of the passenger in the vehicle, based on a range of a seat position in the image and the seat row being specified, the range of the seat position being prepared for each seat row.

Advantageous Effects of Invention

The seating position determination apparatus, the system, the method, and the computer-readable medium according to the present disclosure are able to specify which seat a passenger is seated in, based on an image captured by a camera.

EXAMPLE EMBODIMENT

Example embodiments of the present disclosure are described below in detail with reference to the drawings. Note that the following description and the drawings are appropriately omitted and simplified for clarity of description. Further, in the following drawings, the same elements and similar elements are denoted by the same reference symbols, and repetitive description thereof is omitted as required.

Figure 1:
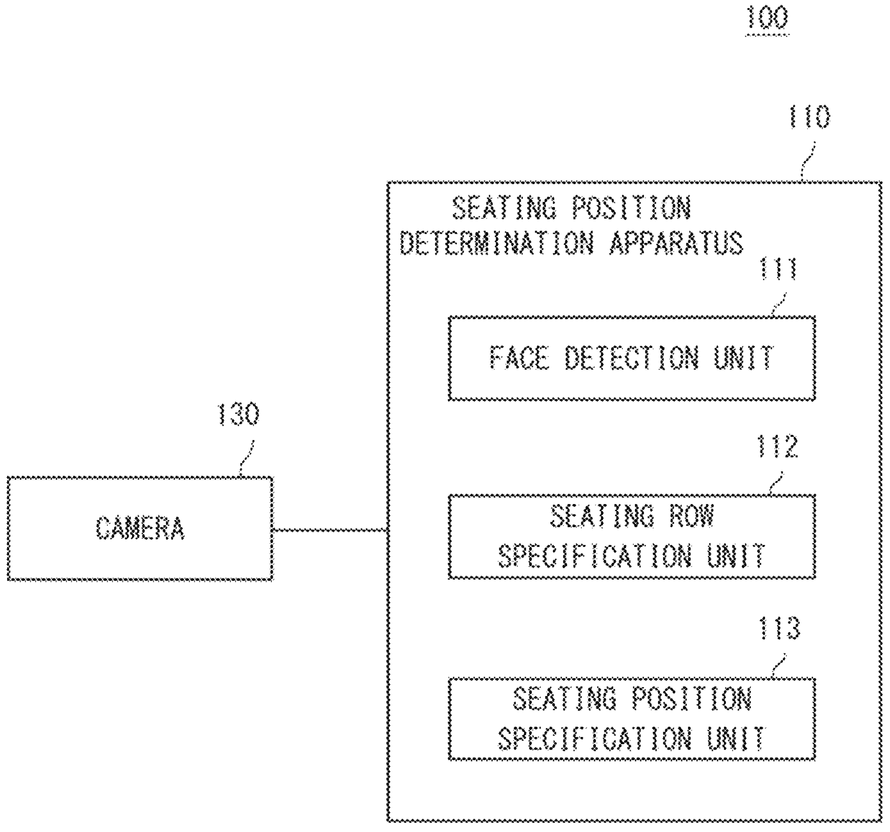
FIG. 1 is a block diagram illustrating a seating position determination system according to a first example embodiment of the present disclosure.

FIG. 1 illustrates a seating position determination system according to a first example embodiment of the present disclosure. A seating position determination system 100 includes a seating position determination apparatus 110 and a camera 130. The camera 130 the camera 130 captures an image of an inside of a vehicle in which a plurality of seat rows are arranged. For example, the camera 130 is installed at a position between a driver's seat and a passenger's seat that provides a view of the entire interior of the vehicle. The seating position determination apparatus 110 acquires a video being captured by the camera 130, and specifies which seat a passenger boarding on the vehicle is seated in, based on the video being acquired.

Figure 2:
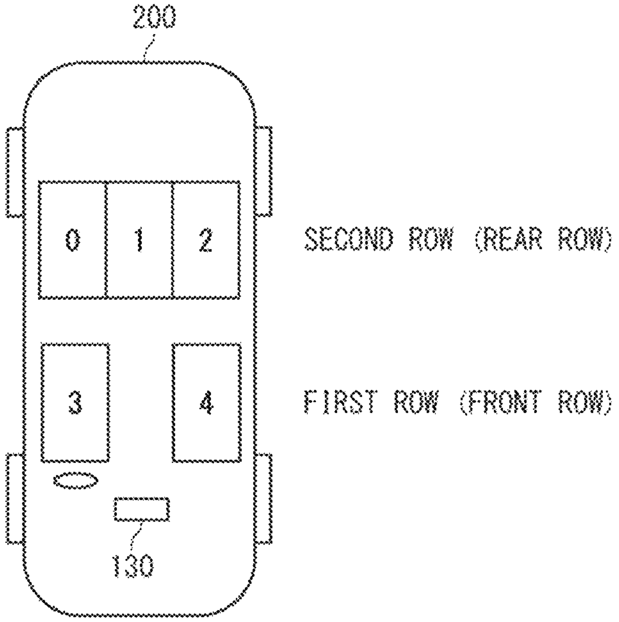
FIG. 2 is a schematic diagram illustrating a vehicle in which a camera is installed.

FIG. 2 illustrates a vehicle in which the camera 130 is installed. For example, a vehicle 200 is a moving body such as a passenger car, a taxi, and a van. For example, in the vehicle 200, the camera 130 is installed at a position such as a root of a room mirror in such a way as to face the interior of the vehicle 200. An image capturing range of the camera 130 includes a region of seats provided to the vehicles. For example, when the vehicle has two seat rows including a front row (first row) for two persons and a rear row (second row) for three persons, the camera 130 captures an image of a range including five seats (0 to 4) in total. Note that, in the seating position determination system 100, the number of cameras 130 is not limited to one. The seating position determination system 100 may include a plurality of cameras 130 arranged in one vehicle.

Information relating to seat arrangement inside a cabin is registered in the seating position determination apparatus 110. For example, information indicating the number of seat rows provided to the vehicle 200 and information indicating the number of seats in each seat row are registered in the seating position determination apparatus 110. Further, information indicating a distance from the camera 130 to each seat row and width of each seat is registered in the seating position determination apparatus 110. The seating position determination apparatus 110 detects a passenger from the video of the camera 130, and specifies which seat the passenger being detected is seated in. For example, the seating position determination apparatus 110 is mounted to the vehicle 200. Alternatively, the seating position determination apparatus 110 may be an apparatus installed outside the vehicle. In such a case, the seating position determination apparatus 110 may acquire the video being captured by the camera 130, via a wireless communication network.

The seating position determination apparatus 110 includes a face detection unit 111, a seating row specification unit 112, and a seating position specification unit 113. For example, the seating position determination apparatus 110 is configured as an apparatus including one or more processors and one or more memories. At least some of the functions of the units in the seating position determination apparatus 110 may be realized by executing processing according to a program being read from a memory by a processor.

The face detection unit (face detection means) 111 detects a face region of a subject (passenger) from the video (image) being captured by the camera 130. When the image includes a plurality of subjects, the face detection unit 111 detects a plurality of face regions. For example, when a face region is newly detected, the face detection unit 111 provides a tracking identifier (ID) to the face region being detected. In the video, the face detection unit 111 tracks a position of the face region being detected, for each tracking ID in a time direction. A detection method of a face region and a tracking method thereof in the face detection unit 111 are not limited to specific methods. For example, the face detection unit 111 is capable of detecting a face region by using a face recognition technique. Further, the face detection unit 111 may track the same face region by using position information relating to a face region.

The seating row specification unit (seating row specification means) 112 specifies a seat row in which a passenger with the face region being detected is seated. For example, the seating row specification unit 112 estimates a distance from a position in the vehicle 200 at which a face region is present to the camera 130 for each tracking ID. In other words, the seating row specification unit 112 estimates a distance from a position of a face of a passenger to the camera 130 for each passenger. For example, the seating row specification unit 112 estimates a distance from a position of a face of a passenger to the camera 130, based on a distance between feature points in a face region. The seating row specification unit 112 estimates a seat row (seating row) a passenger is seated in for each passenger, based on the distance being estimated.

For example, the seating row specification unit 112 extracts eyes of a passenger as feature points, and acquires a distance between both the eyes in the image. For example, the seating row specification unit 112 assumes that the distance between both the eyes is a predetermined value, for example, 6 cm (=0.06 m), and estimates a distance (position) of the passenger in a depth direction in an actual space, based on the distance between both the eyes in the image, and an angle θ of view of the camera 130 and the number D of pixels in a horizontal direction. Specifically, it is assumed that a distance E between both the eyes is 6 cm (=0.06 m), the distance between both the eyes in the image is $D_e$, and a distance H from eyes to a back of a head of a person is a predetermined value of 30 cm (=0.3 m). In a case of a central projection method, when a pinhole camera model is used, a distance $Y_e$ of the passenger in the depth direction in the actual space can be calculated by using the following expression.

$$Y_e = \frac{E \cdot D}{2 \cdot D_e \cdot \tan\frac{\theta}{2}} + H$$

In a case of an equidistant projection method, the distance $Y_e$ of the passenger in the depth direction in the actual space can be calculated by using the following expression.

$$Y_e = \frac{E \cdot D}{2 \cdot D_e \cdot \frac{\theta}{2}} + H$$

The distance $Y_e$ given above is a simplified expression without consideration of lens distortion or the like. The seating row specification unit 112 may calculate the distance $Y_e$ by using an expression considering distortion aberration in a lens used in the camera 130 or the like.

The seating row specification unit 112 specifies which seat row the passenger is seated in, based on the distance $Y_e$ being acquired as described above and a distance from each seat row to the camera 130. For example, the seating row specification unit 112 calculates a difference between the distance $Y_e$ and the distance from each seat row to the camera 130. The seating row specification unit 112 specifies a seat row the passenger is seated in, based on the difference being calculated. For example, the seating row specification unit specifies a seat row with the smallest difference as the seat row the passenger is seated in. When a seat is configured in such a way that a reclining angle and a front-and-rear position are adjustable, the seating row specification unit 112 may acquire control information relating to the seat from the vehicle, and may change the distance from each seat row to the camera 130 according to the control information being acquired. For example, the seating row specification unit 112 may acquire a reclining angle of the seat from the vehicle, and may calculate the distance from each seat row to the camera 130, based on the reclining angle being acquired.

Note that the method of estimating a distance of a passenger in the depth direction by the seating row specification unit 112 is not particularly limited to the above-mentioned method. For example, the seating row specification unit 112 may estimate a distance of the passenger in the depth direction by using feature points other than the eyes. Alternatively, the seating row specification unit 112 may estimate a distance of the passenger in the depth direction from an image of the camera 130 by depth degree estimation using deep learning. When the camera 130 is a stereo camera, the seating row specification unit 112 may estimate a distance of the passenger in the depth direction by using a parallax image. Moreover, the seating row specification unit 112 may acquire distance information from a time-of-flight (ToF) camera or a distance measurement apparatus.

In the seating position specification unit (seating position specification means) 113, information indicating a position (range) of each seat in a camera image is registered for each seat row. A position of each seat (a region of a seat position) in a camera image can be acquired by (a) acquiring coordinates of a seat position in a top-down view in a camera coordinate system in which the camera is the origin and (b) calculating coordinates $D_s$ of each seat position in a vehicle width direction (X direction) in an image, based on a relationship between the angle θ of view and the number D of pixels in the horizontal direction of the camera, and a distance $Y_s$ between the camera and each seat row in the actual space.

In a case of a central projection method, when a pinhole camera model is used, the coordinates $D_s$ of each seat position in the vehicle width direction can be calculated by using the expression given below.

$$D_s = D \cdot \frac{\tan\theta_s}{\tan\frac{\theta}{2}}$$

Further, in a case of an equidistant projection method, the coordinates $D_s$ of each seat position in the vehicle width direction (X direction) can be calculated by using the expression given below.

$$D_s = D \cdot \frac{\theta_s}{\frac{\theta}{2}}$$

In the expression given above, $\theta_s$ indicates an angle formed between a linear line connecting the position of the camera 130 (the origin) and a head rest of each seat to each other and a longitudinal direction (Y axis) of the vehicle. The expression for the coordinates $D_s$ given above is a simplified expression without consideration of lens distortion or the like. The seating position specification unit 113 may calculate the coordinates $D_s$ by using an expression considering distortion aberration in a lens used in the camera 130 or the like. The method of specifying a position of each seat in a camera image is not particularly limited to the above-mentioned method.

For example, when the number of seat rows is two, the seating position specification unit 113 stores a seat range in an image for each seat in the front row and each seat in the rear row. For example, when it is specified that a passenger is seated in the rear row, the seating position specification unit 113 compares a range of a face region with a range of each of the seat 0, the seat 1, and the seat 2 (see FIG. 2). When it is specified that a passenger is seated in the front row, the seating position specification unit 113 compares a range of a face region with a range of each of the seats 3 and 4. The seating position specification unit 113 acquires a ratio (superposition rate) at which the range of seat position and the face region overlap with each other for each seat, and specifies which seat the passenger is seated in, based on the superposition rate.

Figure 3:
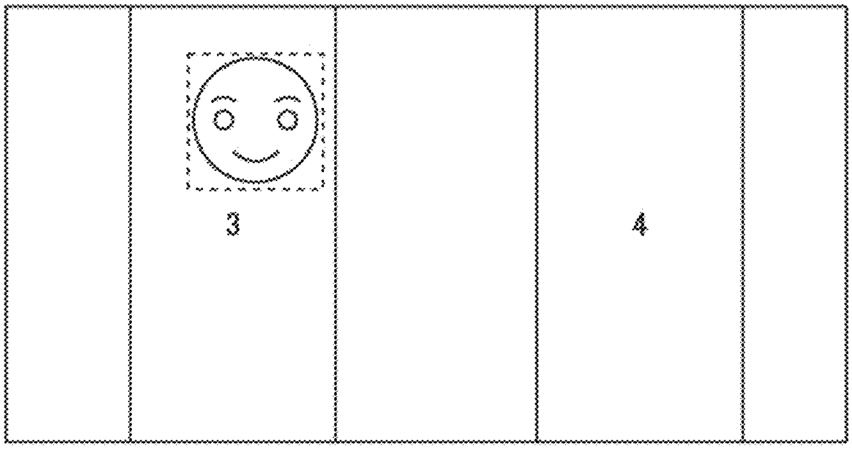
FIG. 3 is a schematic diagram illustrating a relationship between a face region being detected and a range of each seat.

FIG. 3 schematically illustrates a relationship between the face region being detected and the range of each seat. In this example, it is specified that a passenger is seated in the front row.

The seating position specification unit 113 calculates the superposition rate of the face region and the seat range, in other words, a degree at which the range of the face region and the range of each seat overlap with each other. In the example of FIG. 3, the superposition rate of the face region and the range of the seat 3 is 100%, and the superposition rate of the face region and the range of the seat 4 is 0%. In this case, the seating position specification unit 113 specifies that the passenger is seated in the seat 3.

When it is determined that a passenger is seated in the rear row, the seating position specification unit 113 calculates the superposition rate of the face region and the range of the seat 0, the superposition rate of the face region and the range of the seat 1, and the superposition rate of the face region and the range of the seat 2. The seating position specification unit 113 specifies a seat with the highest superposition rate of the seat 0, the seat 1, and the seat 2 as the seat the passenger is seated in.

Figure 4:
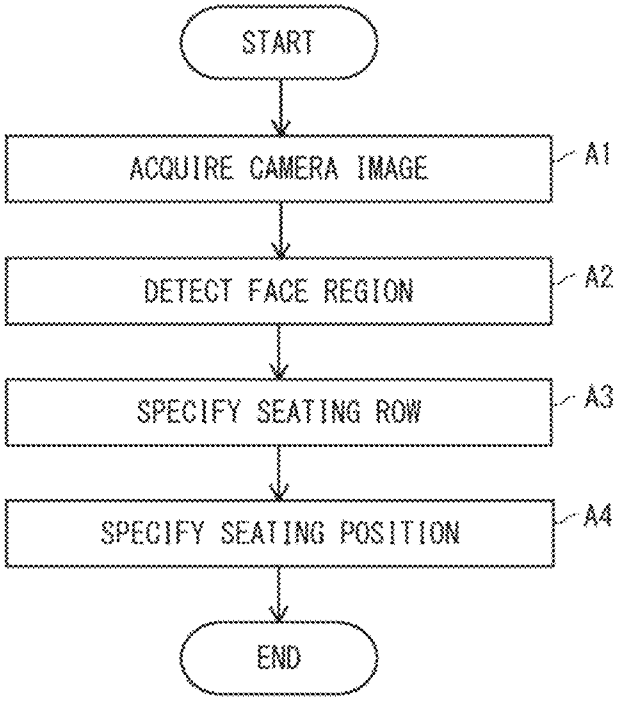
FIG. 4 is a flowchart illustrating an operation procedure of a seating position determination apparatus.

Next, an operation procedure is described. FIG. 4 illustrates an operation procedure (seating position determination method) of the seating position determination apparatus 110. The face detection unit 111 acquires an image from the camera 130 (step A1). The face detection unit 111 detects a face region from the image being acquired (step A2). The seating row specification unit 112 specifies a seating row with regard to the face region being detected (step A3). For example, in step A3, the seating row specification unit 112 extracts a plurality of feature points in the face region. The seating row specification unit 112 assumes that a distance between the plurality of feature points being extracted is a constant value, and estimates a position of the face region in the depth direction (the longitudinal direction of the vehicle). The seating row specification unit 112 specifies the seating row of the face region, based on the position being estimated in the depth direction.

The seating position specification unit 113 specifies a seat position of the passenger, based on the range of each seat in the seating row being specified in step A3 in the image and the range of the face region (step A4). For example, in step A4, the seating position specification unit 113 calculates a superposition rate of the range of each seat in the seating row being specified in the image and the range of the face region. The seating position specification unit 113 specifies a seat with the highest superposition rate as the seating position of the passenger. The seating position specification unit 113 is capable of outputting the specified seat position of the passenger to an external apparatus, which is omitted in illustration.

In the present example embodiment, the seating row specification unit 112 specifies the seat row in which the passenger with the face region being detected by the face detection unit 111 is seated. The seating position specification unit 113 specifies the seat position of the passenger in the vehicle, based on the range of the seat position in the image and the seat row being specified by the seating row specification unit 112, the range of the seat position being prepared for each seat row. With this, the seating position determination apparatus 110 is capable of specifying not only the position of the passenger in the vehicle but also the seat the passenger is seated in, based on the camera image. In the present example embodiment, for example, the seating position determination apparatus 110 is capable of specifying the seating position of the passenger, by using a video of one camera 130 installed between the driver's seat and the passenger's seat. In this case, only one camera 130 being used is required, and the seating position of the passenger can be specified at low cost.

Figure 5:
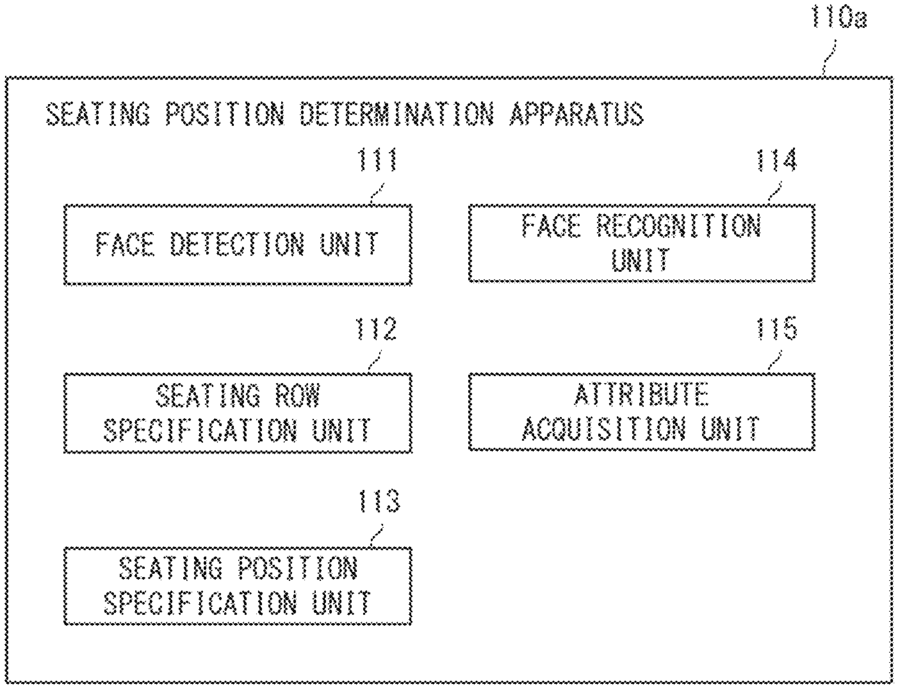
FIG. 5 is a block diagram illustrating a seating position determination apparatus according to a second example embodiment of the present disclosure.

Subsequently, a second example embodiment of the present disclosure is described. FIG. 5 illustrates a seating position determination apparatus according to the second example embodiment of the present disclosure. The seating position determination apparatus 110 according to the present example embodiment includes a face recognition unit 114 and an attribute acquisition unit 115 in addition to the constituent elements of the seating position determination apparatus 110 according to the first example embodiment illustrated in FIG. 1. The face recognition unit (face recognition means) 114 subjects the face region being detected to face recognition. When the passenger with the face region being detected is a person registered in advance, the face recognition unit 114 outputs information for identifying the person as a recognition result.

The attribute acquisition unit (attribute acquisition means) 115 acquires attribute information relating to the person being identified by the face recognition unit 114. For example, the attribute acquisition unit 115 acquires the attribute information relating to the person being identified by the face recognition unit 114 from a database in which attribute information relating to a plurality of persons is stored. For example, the attribute information includes information indicating age, gender, an occupation, a hobby, and the like. In the present example embodiment, in addition to the specified seat position of the passenger, the seating position specification unit 113 is capable of outputting information for identifying the passenger or attribute information relating to the passenger to an external apparatus, which is omitted in illustration.

In the present example embodiment, the face recognition unit 114 subjects the face region being detected to face recognition, and identifies an individual. Further, the attribute acquisition unit 115 acquires the attribute information relating to the passenger. In the present example embodiment, a seating position determination apparatus 110*a* is capable of specifying not only a seat position of a passenger but also who is seated in which seat. Alternatively, the seating position determination apparatus 110*a* is capable of specifying which person with specific attribute information is seated in which seat.

Note that description is made above on an example in which the attribute acquisition unit 115 acquires a recognition result from the face recognition unit 114 and acquires attribute information relating to a person identified by the face recognition unit 114. However, the present example embodiment is not limited thereto. For example, the attribute acquisition unit 115 may acquire attribute information such as an age group and gender from the face region being detected by the face detection unit 111.

Figure 6:
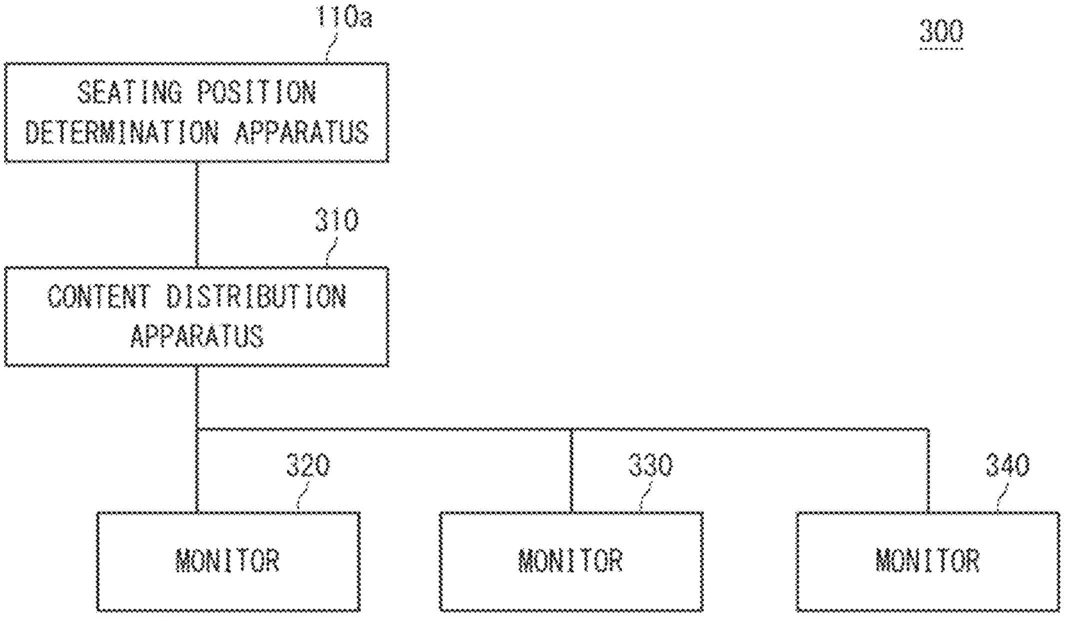
FIG. 6 is a block diagram illustrating a content distribution system using the seating position determination apparatus.

For example, the seating position determination apparatus 110*a* according to the present example embodiment may be used in a content distribution system. FIG. 6 illustrates a content distribution system using the seating position determination apparatus 110*a*. A content distribution system 300 includes the seating position determination apparatus 110*a*, a content distribution apparatus 310, and a plurality of monitors 320 to 340. It is assumed that, in the content distribution system 300, for example, the monitor 320 is a monitor for the seat 4 (passenger's seat) illustrated in FIG. 2. For example, it is assumed that the monitor 330 is a monitor for the seat 0 illustrated in FIG. 2. For example, it is assumed that the monitor 340 is a monitor for the seat 2 illustrated in FIG. 2.

The content distribution apparatus 310 acquires information indicating the seat the passenger is seated in from the seating position determination apparatus 110*a*. Alternatively, the content distribution apparatus 310 acquires information indicating whether a passenger is seated in each seat from the seating position determination apparatus 110*a*. Further, the content distribution apparatus 310 acquires information for identifying a person seated in each seat or attribute information relating to a person seated in each seat from the seating position determination apparatus 110*a*. The content distribution apparatus 310 output contents to the monitors 320 to 340. For example, the contents being output to the monitors 320 to 340 include an advertisement content and a video content.

For example, the content distribution apparatus 310 outputs a content to a monitor associated with a seat a passenger is seated in. The content distribution apparatus 310 may not output a content to a monitor associated with a seat no one is seated in. When the content distribution apparatus 310 acquires information for identifying a person seated in a seat, the content distribution apparatus 310 may output a content, which is customized according to the person being identified, to the monitor. When attribute information relating to a person seated in a seat is acquired, the content distribution apparatus 310 may output a content according to the attribute information being acquired to the monitor. The content distribution apparatus 310 may distribute a general content to a monitor associated with a seat for which a person is not identified or attribute information is not acquired.

The information for identifying a person seated in each seat or the attribute information relating to a person seated in each seat, which is acquired by the seating position determination apparatus 110*a*, may be used for control of the vehicle 200. For example, control of the vehicle 200 may include adjustment of a reclining angle or a front-and-rear position of a seat, a temperature setting or an airflow setting of an air-conditioning apparatus, and the like. For example, the vehicle 200 may adjust a reclining angle or a front-and-rear position of a seat according to the information for identifying a person seated in a seat in the front row or the attribute information relating to a person seated in a seat in the front row. Alternatively, the vehicle 200 may change a setting of the air-conditioning apparatus according to the information for identifying a person seated in each seat or the attribute information relating to a person seated in each seat.

Subsequently, a third example embodiment of the present disclosure is described. The configuration of the seating position determination apparatus according to the present example embodiment is similar to the configuration of the seating position determination apparatus 110 according to the first example embodiment illustrated in FIG. 1. The configuration of the seating position determination apparatus according to the present example embodiment may be similar to the configuration of the seating position determination apparatus 110*a* according to the second example embodiment illustrated in FIG. 5.

In the first example embodiment, in a case in which the seating row specification unit 112 estimates a distance in the depth direction by using the fact that the distance between the feature points is a constant value, when a passenger turns to a side, the distance between the feature points is reduced, and the distance being estimated in the depth direction is longer than the actual distance in some cases. For example, a passenger seated in a seat in the frontmost row closest to the camera turns to a side, the distance between both the eyes in the image is equal to or less than a half of the actual distance in some cases. In such a case, when the distance being estimated in the depth direction is longer than the actual distance, the seating row specification unit 112 erroneously specifies a seating row of the passenger seated in the front row as the rear row in some cases. The present example embodiment is an example embodiment that solves at least a part of such a problem.

In the present example embodiment, it is assumed that, when a face region is detected, the face detection unit 111 provides the face region with a tracking ID and tracks the face region for each tracking ID. When a passenger seated in the front row is to move to the rear row, it is assumed that the passenger faces backward while moving. In this case, detection of the face region is temporarily interrupted, and it cannot be assumed that the face region moves from the front row to the rear row while maintaining the same tracking ID. In the present example embodiment, the seating row specification unit 112 counts the number of times for which a seating row of each passenger is specified as the front row. When the number of times for which a seating row of a passenger is specified as the front row (front row count) is equal to or greater than a certain value, the seating row specification unit 112 specifies that the passenger is seated in the front row as long as the face region is successively detected.

Note that, it is assumed that a distance between feature points of a person seated in the rear row is not changed by twice or more according to orientation of the face. Thus, it is assumed that the rear row the passenger is seated in is not erroneously recognized as the front row. Further, in the description given above, description is made on a case in which the front row the passenger is seated in is erroneously recognized as the rear row by estimating the distance in the depth direction, based on the distance between the feature points in the face region. However, in the present example embodiment, distance estimation in the depth direction is not particularly limited to estimation based on the distance between the feature points in the face region. The present example embodiment is also applicable to a case other than the case in which a distance in the depth direction is estimated based on the distance between the feature points in the face region.

Figure 7:
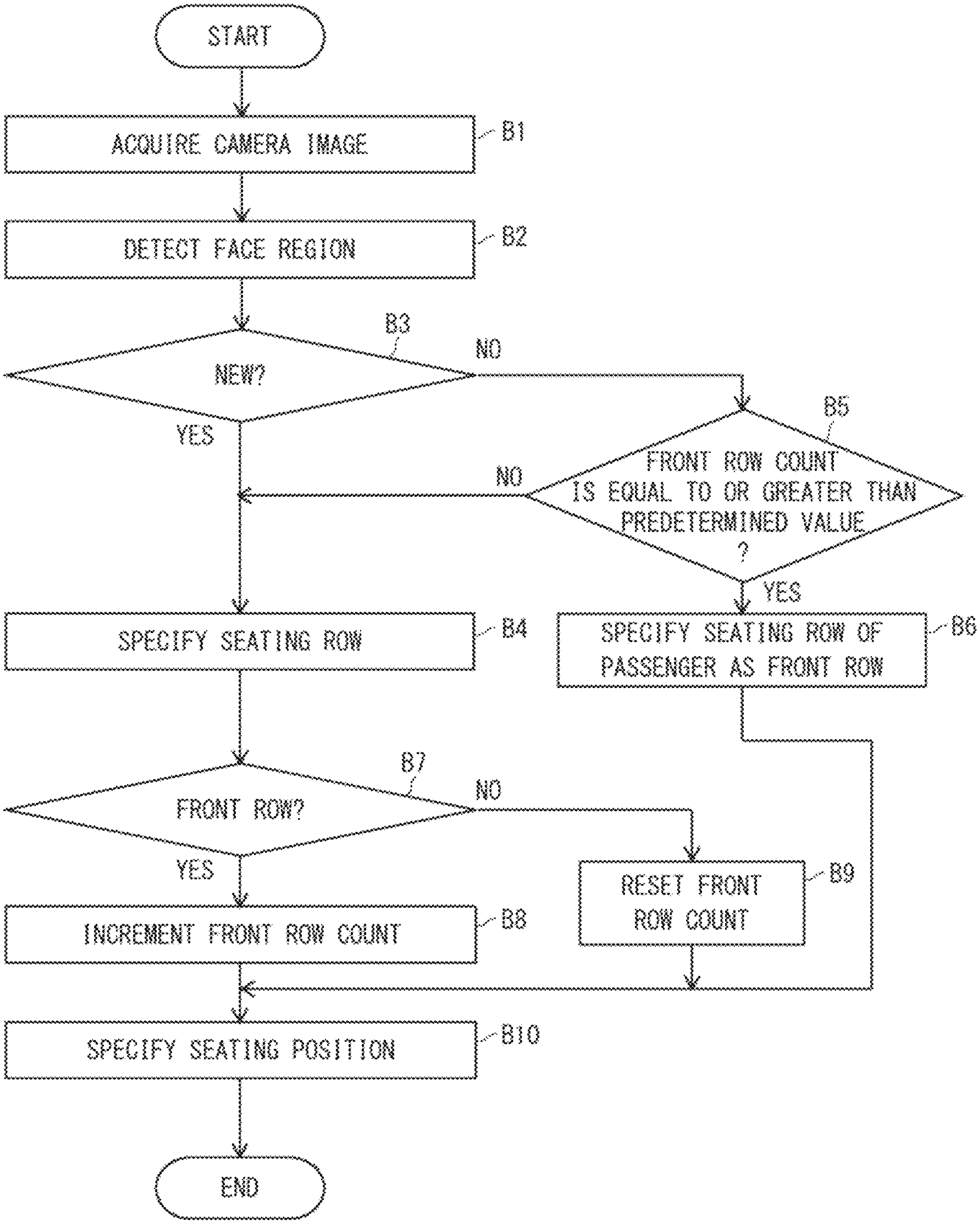
FIG. 7 is a flowchart illustrating an operation procedure of a seating position determination apparatus according to a third example embodiment of the present disclosure.

FIG. 7 illustrates an operation procedure of the seating position determination apparatus 110 according to the present example embodiment. The face detection unit 111 acquires an image from the camera 130 (step B1). The face detection unit 111 detects a face region from the image being acquired (step B2). Steps B1 and B2 may be similar to steps A1 and A2 illustrated in FIG. 4.

The seating row specification unit 112 determines whether the face region being detected in step B2 is a new face region (step B3). In other words, the seating row specification unit 112 determines whether the face region being detected in step B2 is the face region being continuously detected from before or a face region being newly detected. For example, the seating row specification unit 112 determines whether the face region being detected is a new face region, based on the tracking ID being provided to the face region by the face detection unit 111.

When it is determined that the face region being detected is a new face region in step B3, the seating row specification unit 112 specifies a seating row for the face region being detected (step B4). Step B4 may be similar to step A3 illustrated in FIG. 4.

When it is determined that, in step B3, the face region being detected is not a new face region, in other words, the face region being detected is the face region being previously detected, the seating row specification unit 112 determines whether the front row count is equal to or greater than a predetermined value (step B5). When it is determined that the front row count is equal to or greater than the predetermined value in step B5, the seating row specification unit 112 specifies that the passenger is seated in the front row (step B6). When it is determined that the front row count is not equal to or greater than the predetermined value in step B5, the seating row specification unit 112 proceeds to step B4, and specifies a seating row for the face region being detected.

The seating row specification unit 112 determines whether the row the passenger is seated in is specified as the front row (step B7). When it is determined that the row the passenger is seated in is specified as the front row in step B7, the seating row specification unit 112 adds one to the front row count (step B8). When it is determined that the row the passenger is seated in is not specified as the front row in step B7, the seating row specification unit 112 resets the front row count (step B9).

The seating position specification unit 113 specifies a seating position of the passenger, based on the range of each seat in the seating row being specified in step B4 or B6 in the image and the range of the face region (step B10). Step B10 may be similar to step A4 illustrated in FIG. 4.

In the present example embodiment, the seating row specification unit 112 increments the front row count whenever the seating row of the passenger whose face region is successively detected is specified as the front row. When the front row count is equal to or greater than the predetermined value, the seating row specification unit 112 specifies the seating row of the passenger as the front row. In this case, when the seating row of the passenger is successively specified as the front row for the predetermined number of times or more, the seating row is specified as the front row as long as the face detection of the passenger successively succeeds. Thus, in the present example embodiment, it can be prevented that the front row the passenger is seated in is erroneously specified as the rear row. Other effects are similar to the effects in the first example embodiment or the second example embodiment.

A fourth example embodiment of the present disclosure is described. The configuration of the seating position determination apparatus according to the present example embodiment is similar to the configuration of the seating position determination apparatus 110 according to the first example embodiment illustrated in FIG. 1. The configuration of the seating position determination apparatus according to the present example embodiment may be similar to the configuration of the seating position determination apparatus 110*a* according to the second example embodiment illustrated in FIG. 5.

In the third example embodiment, it is assumed that the rear row the passenger is seated in is not erroneously specified as the front row. However, when the passenger seated in the rear row moves laterally while being seated in the rear row, the posture leans forward, and the distance being estimated in the 5 depth direction is reduced in some cases. For example, when which the seating row specification unit 112 estimates a distance in the depth direction by using the fact that the distance between the feature points is a constant value, the distance between the feature points of the passenger seated in the rear row is reduced in some cases. Specifically, when the passenger leans forward, the distance between both the eyes in the image is equal to or larger than a half of the actual distance. In such a case, when the distance being estimated in the depth direction is shorter than the actual distance, the seating row specification unit 112 erroneously specifies the seating row the passenger is seated in, which is the rear row, as the front row in some cases. In this case, the premise assumed in the third example embodiment that the seating row the passenger seated in, which is the rear row, is not erroneously specified as the front row does not hold. The present example embodiment is an example embodiment that solves at least a part of the above-mentioned problem.

In the present example embodiment, even in a case in which the seating row is specified as the front row, when the passenger moves, the seating row specification unit 112 does not add one to the front row count. For example, the seating row specification unit 112 determines whether the passenger moves, based on whether a position of the face region is changed. More specifically, for example, the seating row specification unit 112 determines whether the passenger moves, based on a distance between a center of a frame indicating a face region, in other words, a face detection frame and a center of a face detection frame from predetermined frames prior thereto. For example, the seating row specification unit 112 may determine whether the passenger moves, based on whether the distance between the centers of the face detection frames is equal to or less than a predetermined ratio (L %, where L is a positive integer) of the width of the face detection frame. For example, when the distance between the centers of the face detection frames exceeds L % of the width of the face detection frame, the seating row specification unit 112 determines that the passenger moves. When the passenger moves, the seating row specification unit 112 resets the front row count without increment. With this, the front row count can be prevented from being incremented to the predetermined value or greater while the passenger moves, and the seating row the passenger is seated in, which is the rear row, can be prevented from being erroneously specified as the front row.

Figure 8:
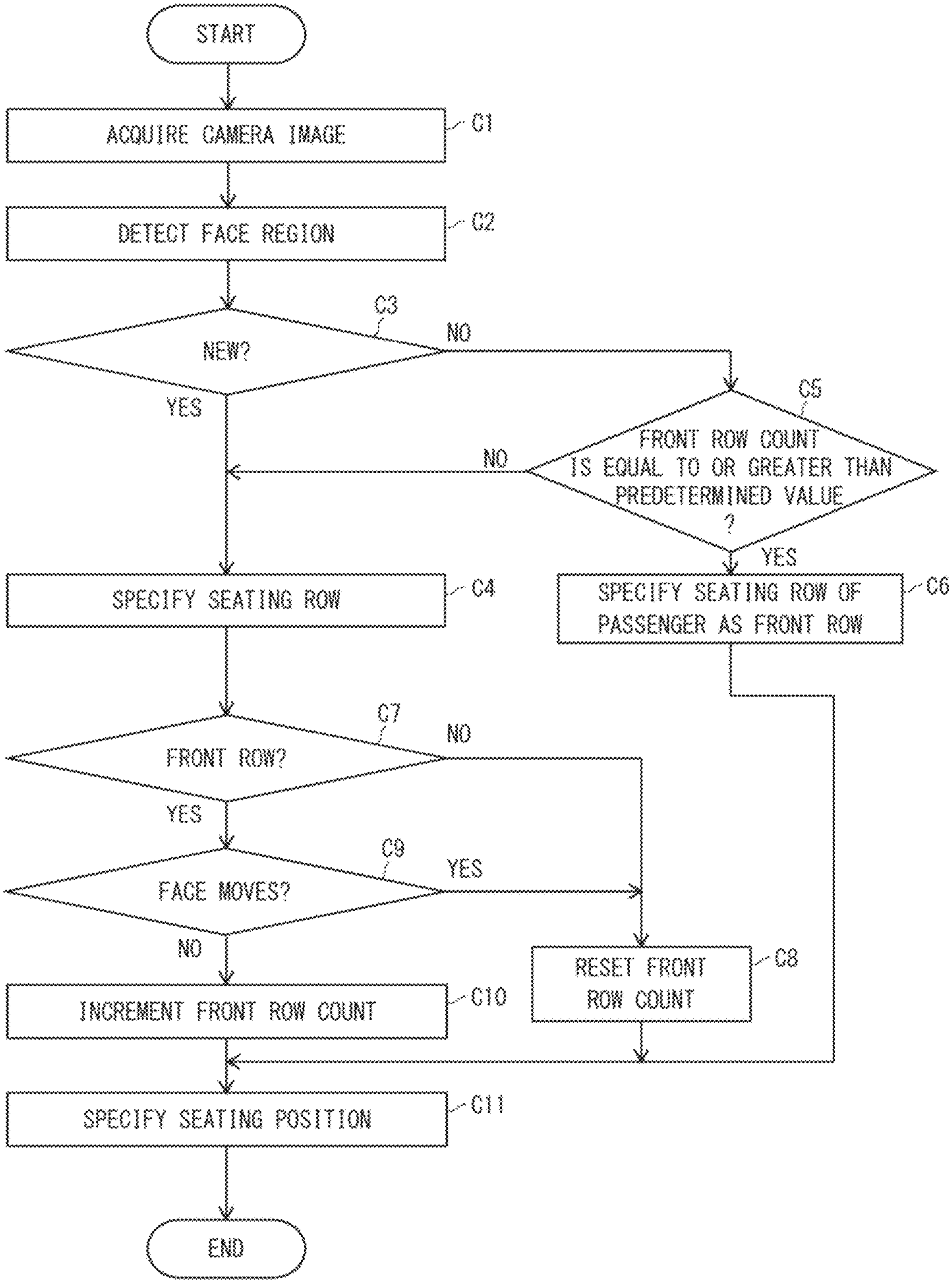
FIG. 8 is a flowchart illustrating an operation procedure of a seating position determination apparatus according to a fourth example embodiment of the present disclosure.

FIG. 8 illustrates an operation procedure of the seating position determination apparatus 110 according to the present example embodiment. The face detection unit 111 acquires an image from the camera 130 (step C1). The face detection unit 111 detects a face region from the image being acquired (step C2). The seating row specification unit 112 determines whether the face region being detected in step C2 is a new face region (step C3). For example, the seating row specification unit 112 determines whether the face region being detected is a new face region, based on the tracking ID being provided to the face region by the face detection unit 111.

When it is determined that the face region being detected is a new face region in step C3, the seating row specification unit 112 specifies a seating row for the face region being detected (step C4). When it is determined that the face region being detected is not a new face region in step C3, the seating row specification unit 112 determines whether the front row count is equal to or greater than the predetermined value (step C5). When it is determined that the front row count is equal to or greater than the predetermined value in step C5, the seating row specification unit 112 specifies the row the passenger is seated in is the front row (step C6). When it is determined that the front row count is not equal to or greater than the predetermined value in step C5, the seating row specification unit 112 proceeds to step C4, and specifies a seating row for the face region being detected.

The seating row specification unit 112 determines whether the row the passenger is seated in is specified as the front row (step C7). Steps C1 to C7 may be similar to steps B1 to B7 illustrated in FIG. 7. When it is determined that the row the passenger is seated in is not the front row in step C7, the seating row specification unit 112 resets the front row count (step C8). When it is determined that the row the passenger is seated in is specified as the front row in step C7, the seating row specification unit 112 determines whether the passenger moves (step C9). When it is determined that the passenger does not move in Step C9, the seating row specification unit 112 adds one to the front row count (step C10). When it is determined that the passenger moves in Step C9, the seating row specification unit 112 proceeds to step C8, and resets the front row count.

The seating position specification unit 113 specifies a seating position of the passenger, based on the range of each seat in the seating row being specified in step C4 or C6 in the image and the range of the face region (step C11). Further, steps C8, C10, and C11 may be similar to steps B9, B8, and B10 illustrated in FIG. 7, respectively.

In the present example embodiment, the seating row specification unit 112 determines whether a position of the face region is changed for the passenger (face region) whose seating row is specified as the front row. When it is determined that the position of the face region is changed, the seating row specification unit 112 does not increment the front row count. With this, even when the row the passenger is seated in, which is the rear row, is erroneously specified as the front row, the front row count can be prevented from being incremented to the predetermined value or greater, and successive specification of the seating row as the front row can be prevented. Other effects are similar to the effects in the third example embodiment.

Figure 9:
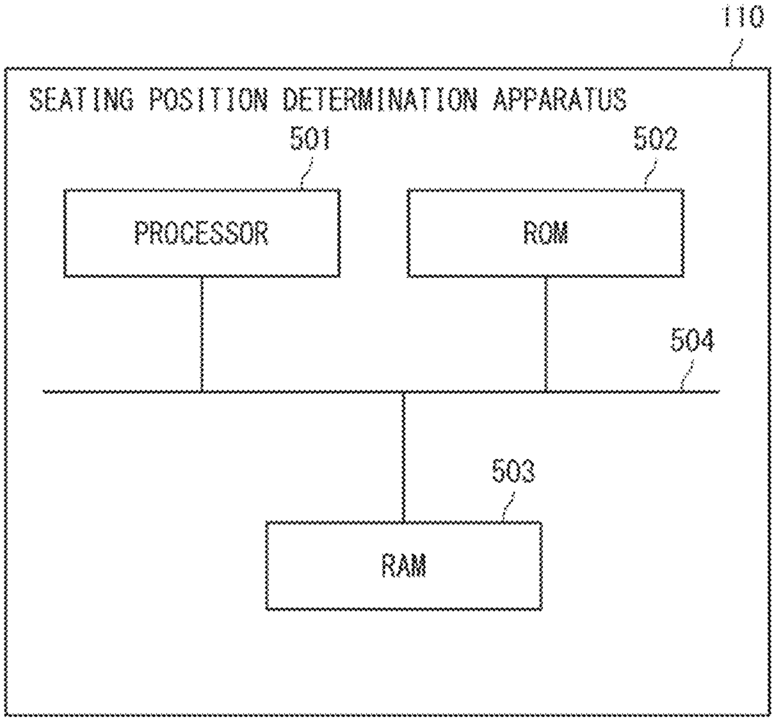
FIG. 9 is a block diagram illustrating a hardware configuration of a seating position determination apparatus 110.

Subsequently, a hardware configuration of the seating position determination apparatus 110 is described. FIG. 9 illustrates a hardware configuration of the seating position determination apparatus 110. The seating position determination apparatus 110 includes a processor (central processing unit: CPU) 501, a read only memory (ROM) 502, and a random access memory (RAM) 503. In the seating position determination apparatus 110, the processor 501, the ROM 502, and the RAM 503 are connected to one another via a bus 504. The seating position determination apparatus 110 may include other circuits such as a peripheral circuit, a communication circuit, and an interface circuit, which are omitted in illustration.

The ROM 502 is a non-volatile storage device. For example, a semiconductor storage device such as a flash memory with relatively small capacity is used as the ROM 502. The ROM 502 stores a program executed by the processor 501.

The above-mentioned program includes a command group (or a software code) for causing a computer to execute one or more of the functions described in the example embodiments when the program is read by the computer. The program may be stored in a non-transitory computer-readable medium or a solid storage medium. Examples of the computer-readable medium or the solid storage medium include, but are not limited to, a RAM, a ROM, a flash memory, a solid-state drive (SSD), or other memory techniques, a compact disc (CD), a digital versatile disc (DVD), a Blu-ray (registered trademark) disc, or other optical disc storages, and a magnetic cassette, a magnetic tape, a magnetic disc storage, or other magnetic storage devices. The program may be transmitted via a non-transitory computer-readable medium or a communication medium. Examples of the non-transitory computer-readable medium or the communication medium include, but are not limited to, a propagation signal in an electric, optical, acoustic, or other formats.

The RAM 503 is a volatile storage device. Various types of semiconductor memory devices such as a dynamic random access memory (DRAM) and a static random access memory (SRAM) are used as the RAM 503. The RAM 503 may be used as an internal buffer for temporarily storing data and the like.

The processor 501 loads the program being stored in the ROM 502 into the RAM 503, and executes the program. When the CPU 501 executes the program, the functions of the units in the seating position determination apparatus 110 may be realized.

While the example embodiments of the present disclosure are described above in detail, the present disclosure is not limited to the above-mentioned example embodiments, and modifications or amendments that are made to the above-mentioned example embodiments within the scope of the present disclosure are also considered part of the present disclosure.

For example, the whole or a part of the example embodiments described above can be described as, but not limited to, the following supplementary notes.

Supplementary Note 1

A seating position determination apparatus including:

a face detection means for detecting a face region of a passenger from an image captured by a camera installed inside a vehicle in which a plurality of seat rows are arranged;

a seating row specification means for specifying a seat row in which the passenger with the face region being detected is seated; and a seating position specification means for specifying a seat position of the passenger in the vehicle, based on a range of a seat position in the image and the seat row being specified, the range of the seat position being prepared for each seat row.

Supplementary Note 2

The seating position determination apparatus according to Supplementary Note 1, wherein the seating position specification means specifies a seat position of the passenger, based on a position of the face region and a position range of each of a plurality of seats in the seat row being specified.

Supplementary Note 3

The seating position determination apparatus according to Supplementary Note 1 or 2, wherein the seating position specification means specifies a seat position of the passenger, based on a ratio of the face region overlapping with a position range of each of a plurality of seats in the seat row being specified.

Supplementary Note 4

The seating position determination apparatus according to Supplementary Note 3, wherein the seating position specification means specifies a seat having the highest ratio in the seat row being specified as a seat position of the passenger.

Supplementary Note 5

The seating position determination apparatus according to any one of Supplementary Notes 1 to 4, wherein the seat rows include a first row on a side closer to the camera in a longitudinal direction of the vehicle and a second row behind the first row, the face detection means tracks the detected face region, in a time direction, and the seating row specification means counts, as a front row count, the number of times at which the first row is specified as a row in which the passenger is seated, and specifies the first row as a row in which the passenger is seated when the front row count for the passenger with the face region being successively detected by the face detection means is equal to or greater than a predetermined value.

Supplementary Note 6

The seating position determination apparatus according to Supplementary Note 5, wherein, when the second row is specified as a row in which the passenger is seated, the seating row specification means resets the front row count.

Supplementary Note 7

The seating position determination apparatus according to Supplementary Note 5 or 6, wherein the seating row specification means determines whether a position of the face region changes when the first row is specified as a row in which the passenger is seated, and resets the front row count when it is determined that a position of the face region changes.

Supplementary Note 8

The seating position determination apparatus according to any one of Supplementary Notes 1 to 7, wherein the seating row specification means extracts a plurality of feature points from an image of the face region, estimates a position in the longitudinal direction of the vehicle, based on a distance between a plurality of the extracted feature points, and specifies the seat, based on the position being estimated in the longitudinal direction.

Supplementary Note 9

The seating position determination apparatus according to Supplementary Note 8, wherein, while assuming that a distance between a plurality of feature points in an actual space is a constant value, the seating row specification means estimates a position in the longitudinal direction of the vehicle, based on a distance between a plurality of the extracted feature points and a distance between a plurality of the feature points in the actual space.

Supplementary Note 10

The seating position determination apparatus according to any one of Supplementary Notes 1 to 9, further including a face recognition means for subjecting an image of the detected face region to face recognition and specifying the passenger with the face region being detected.

Supplementary Note 11

The seating position determination apparatus according to any one of Supplementary Notes 1 to 10, further including an attribute acquisition means for acquiring attribute information relating to the passenger with the face region being detected.

Supplementary Note 12

The seating position determination apparatus according to any one of Supplementary Notes 1 to 11, wherein the seating row specification means acquires control information relating to the seat and specifying a seat row in which the passenger is seated by using the acquired control information relating to the seat.

Supplementary Note 13

A seating position determination system including:

a camera being installed in a vehicle in which a plurality of seat rows are arranged and being configured to capture an image of an inside of the vehicle; and a seat position determination apparatus configured to acquire an image captured by the camera and specifying a seat position of a passenger in the vehicle by using the acquired image, wherein the seat position determination apparatus includes:

a face detection means for detecting a face region of the passenger from the image;

a seating row specification means for specifying a seat row in which the passenger with the face region being detected is seated; and a seating position specification means for specifying a seat position of the passenger in the vehicle, based on a range of a seat position in the image and the seat row being specified, the range of the seat position being prepared for each seat row.

Supplementary Note 14

The seating position determination system according to Supplementary Note 13, wherein the seating position specification means specifies a seat position of the passenger, based on a position of the face region and a position range of each of a plurality of seats in the seat row being specified.

Supplementary Note 15

The seating position determination system according to Supplementary Note 13 or 14, wherein the seating position specification means specifies a seat position of the passenger, based on a ratio of the face region overlapping with a position range of each of a plurality of seats in the seat row being specified.

Supplementary Note 16

A seating position determination method including:

detecting a face region of a passenger from an image captured by a camera installed inside a vehicle in which a plurality of seat rows are arranged;

specifying a seat row in which the passenger with the face region being detected is seated; and specifying a seat position of the passenger in the vehicle, based on a range of a seat position in the image and the seat row being specified, the range of the seat position being prepared for each seat row.

Supplementary Note 17

A non-transitory computer-readable medium configured to store a program for causing a processor to execute processing of:

detecting a face region of a passenger from an image captured by a camera installed inside a vehicle in which a plurality of seat rows are arranged; specifying a seat row in which the passenger with the face region being detected is seated; and specifying a seat position of the passenger in the vehicle, based on a range of a seat position in the image and the seat row being specified, the range of the seat position being prepared for each seat row.

REFERENCE SIGNS LIST

100 SEATING POSITION DETERMINATION SYSTEM

110 SEATING POSITION DETERMINATION APPARATUS

111 FACE DETECTION UNIT
112 SEATING ROW SPECIFICATION UNIT
113 SEATING POSITION SPECIFICATION UNIT
114 FACE RECOGNITION UNIT
115 ATTRIBUTE ACQUISITION UNIT
130 CAMERA
200 VEHICLE
300 CONTENT DISTRIBUTION SYSTEM
310 CONTENT DISTRIBUTION APPARATUS
320 to 340 MONITOR
501 PROCESSOR
502 ROM
503 RAM

The invention claimed is:

1. A seating position determination apparatus comprising:

at least one memory storing instructions; and at least one processor configured to execute the instructions to;

detect a face region of a passenger from an image captured by a camera installed inside a vehicle in which a plurality of seat rows are arranged, the plurality of seat rows including a first row on a side closer to the camera in a longitudinal direction of the vehicle and a second row behind the first row;

specify a seat row in which the passenger with the face region being detected is seated;

specify a seat position of the passenger in the vehicle, based on a range of a seat position in the image and the seat row being specified, the range of the seat position being prepared for each seat row;

track the detected face region in a time direction; and count, as a front row count, the number of times at which the first row is specified as a row in which a passenger is seated, and specify the first row as a row in which the passenger is seated when the front row count for the passenger with the face region being successively detected is equal to or greater than a predetermined value.

2. The seating position determination apparatus according to claim 1, wherein the at least one processor is configured to execute the instructions to specify a seat position of the passenger, based on a position of the face region and a position range of each of a plurality of seats in the seat row being specified.

3. The seating position determination apparatus according to claim 1, wherein the at least one processor is configured to execute the instructions to specify a seat position of the passenger, based on a ratio of the face region overlapping with a position range of each of a plurality of seats in the seat row being specified.

4. The seating position determination apparatus according to claim 3, wherein the at least one processor is configured to execute the instructions to specify a seat having a highest ratio in the seat row being specified as a seat position of the passenger.

5. The seating position determination apparatus according to claim 1, wherein, when the second row is specified as a row in which the passenger is seated, the at least one processor is configured to execute the instructions to reset the front row count.

6. The seating position determination apparatus according to claim 1, wherein the at least one processor is configured to execute the instructions to determine whether a position of the face region changes when the first row is specified as a row in which the passenger is seated, and reset the front row count when it is determined that a position of the face region changes.

7. The seating position determination apparatus according to claim 1, wherein the at least one processor is configured to execute the instructions to extract a plurality of feature points from an image of the face region, estimate a position in the longitudinal direction of the vehicle, based on a distance between a plurality of the extracted feature points, and specify the seat, based on the position being estimated in the longitudinal direction.

8. The seating position determination apparatus according to claim 7, wherein, while assuming that a distance between a plurality of feature points in an actual space is a constant value, the at least one processor is configured to execute the instructions to estimate a position in the longitudinal direction of the vehicle, based on a distance between a plurality of the extracted feature points and a distance between a plurality of the feature points in the actual space.

9. The seating position determination apparatus according to claim 1, the at least one processor is further configured to execute the instructions to subject an image of the detected face region to face recognition and specify the passenger with the face region being detected.

10. The seating position determination apparatus according to claim 1, the at least one processor is further configured to execute the instructions to acquire attribute information relating to the passenger with the face region being detected.

11. The seating position determination apparatus according to claim 1, wherein the at least one processor is configured to execute the instructions to acquire control information relating to the seat and specify a seat row in which the passenger is seated by using the acquired control information relating to the seat.

12. A seating position determination system comprising:

a camera being installed in a vehicle in which a plurality of seat rows are arranged and being configured to capture an image of an inside of the vehicle; and the seat position determination apparatus according to claim 1.

13. The seating position determination system according to claim 12, wherein the at least one processor is configured to execute the instructions to specify a seat position of the passenger, based on a position of the face region and a position range of each of a plurality of seats in the seat row being specified.

14. The seating position determination system according to claim 12, wherein the at least one processor is configured to execute the instructions to specify a seat position of the passenger, based on a ratio of the face region overlapping with a position range of each of a plurality of seats in the seat row being specified.

15. A seating position determination method comprising:

detecting a face region of a passenger from an image captured by a camera installed inside a vehicle in which a plurality of seat rows are arranged, the plurality of seat rows including a first row on a side closer to the camera in a longitudinal direction of the vehicle and a second row behind the first row;

specifying a seat row in which the passenger with the face region being detected is seated;

specifying a seat position of the passenger in the vehicle, based on a range of a seat position in the image and the seat row being specified, the range of the seat position being prepared for each seat row;

tracking the detected face region in a time direction; and counting, as a front row count, the number of times at which the first row is specified as a row in which a passenger is seated, and specify the first row as a row in which the passenger is seated when the front row count for the passenger with the face region being successively detected is equal to or greater than a predetermined value.

16. A non-transitory computer-readable medium configured to store a program for causing a processor to execute processing of:

detecting a face region of a passenger from an image captured by a camera installed inside a vehicle in which a plurality of seat rows are arranged, the plurality of seat rows including a first row on a side closer to the camera in a longitudinal direction of the vehicle and a second row behind the first row;

specifying a seat row in which the passenger with the face region being detected is seated;

specifying a seat position of the passenger in the vehicle, based on a range of a seat position in the image and the seat row being specified, the range of the seat position being prepared for each seat row;

tracking the detected face region in a time direction; and counting, as a front row count, the number of times at which the first row is specified as a row in which a passenger is seated, and specify the first row as a row in which the passenger is seated when the front row count for the passenger with the face region being successively detected is equal to or greater than a predetermined value.

* * * * *